United States Patent
Boettcher

(10) Patent No.: US 11,712,948 B2
(45) Date of Patent: Aug. 1, 2023

(54) HIGH STRENGTH ALUMINUM ALLOY DOOR BEAM

(71) Applicant: Honda Motor Co., Ltd., Tokyo (JP)

(72) Inventor: Eric J. Boettcher, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 181 days.

(21) Appl. No.: 17/080,624

(22) Filed: Oct. 26, 2020

(65) Prior Publication Data
US 2021/0138881 A1     May 13, 2021

Related U.S. Application Data

(60) Provisional application No. 62/934,872, filed on Nov. 13, 2019.

(51) Int. Cl.
| | |
|---|---|
| *B60J 5/04* | (2006.01) |
| *B21D 53/88* | (2006.01) |
| *B23K 20/12* | (2006.01) |
| *B23K 31/02* | (2006.01) |
| *B21D 5/10* | (2006.01) |
| *B23K 103/10* | (2006.01) |

(52) U.S. Cl.
CPC .............. *B60J 5/0443* (2013.01); *B21D 5/10* (2013.01); *B21D 53/88* (2013.01); *B23K 20/122* (2013.01); *B23K 31/027* (2013.01); *B60J 5/0483* (2013.01); *B23K 2103/10* (2018.08)

(58) Field of Classification Search
CPC ..... B21C 37/0815; B21C 37/155; B21D 5/10; B21D 53/88; B23K 20/24; B23K 20/122; B23K 20/2336; B23K 2101/18; B23K 2103/10; B23K 31/027; B60J 5/0483; B60J 5/0443
See application file for complete search history.

(56) References Cited

U.S. PATENT DOCUMENTS

| | | | | |
|---|---|---|---|---|
| 4,210,467 A | * | 7/1980 | Klatzer | C21D 8/10 148/519 |
| 4,717,065 A | * | 1/1988 | Matsui | B21C 37/08 228/146 |
| 7,325,435 B2 | * | 2/2008 | Hamel | B21D 5/015 72/368 |
| 2014/0027023 A1 | * | 1/2014 | Johansen | F17C 13/00 148/400 |
| 2016/0303952 A1 | * | 10/2016 | Hoff | B60J 5/0423 |

FOREIGN PATENT DOCUMENTS

| | | | | |
|---|---|---|---|---|
| DE | 102011008997 A1 | * | 4/2012 | ........... B21C 37/065 |
| EP | 1504844 A1 | * | 2/2005 | ............. B21D 53/30 |

OTHER PUBLICATIONS

Machine Translation for DE-102011008997-A1 (Year: 2011).*

* cited by examiner

*Primary Examiner* — David P Bryant
*Assistant Examiner* — Christine Bersabal
(74) *Attorney, Agent, or Firm* — Rankin, Hill & Clark LLP

(57) ABSTRACT

A vehicle door beam and related methods of making door beams include a flat-rolled aluminum alloy sheet, where two edges of the sheet that are transverse to the roll direction of the sheet are brought together to form a tube. The two edges are friction stir welded together to form a butt joint along a length of the tube. The tube is arranged, along with other optional components, as a side-impact door beam in a vehicle door, such that the butt joint is facing away from an expected impact direction of the vehicle door.

9 Claims, 6 Drawing Sheets

HIGH STRENGTH ALUMINUM ALLOY DOOR BEAM

CROSS REFERENCE TO RELATED APPLICATION

This application claims priority to U.S. Provisional Patent Application Ser. No. 62/934,872 filed Nov. 13, 2019, which is expressly incorporated herein by reference.

BACKGROUND

Existing steel door beams include stamped or rolled boron steel structures. The stamped structures are produced using sheet steel, which is then stamped into a corrugated shaped with an open profile. The rolled structures are produced using a rolling mill to process sheet steel first into a closed tube shape with an ellipse profile, which is then seam welded, heat treated, and then rapidly quenched to set final metallurgy. Current applications of steel door beams with ellipse profiles are used for production efficiency and cost management. In these applications, the beams utilize ultra-high strength steel (UHSS) to distribute loads and try to avoid localized buckling of the door beams under load.

However, these steel door beams are relatively heavy because they are made of steel, and this relatively high weight reduces the fuel efficiency of a vehicle including such steel door beams.

BRIEF DESCRIPTION

According to one aspect, a method of making a tube includes providing a flat-rolled aluminum alloy sheet; bringing together two edges of the sheet that are transverse to the roll direction to thereby form a butt seam; and friction stir welding the butt seam to form the tube with a butt joint.

Another method for producing a door beam includes providing a sheet of flat-rolled aluminum alloy, the sheet having a leading edge, an opposite trailing edge, and a roll direction extending from the leading edge to the trailing edge. The method includes friction stir welding the leading edge to the trailing edge at a butt joint to form a tube of the flat-rolled aluminum alloy, which is then secured to mounting brackets that are securable to a vehicle door.

According to another aspect, a beam includes a flat-rolled aluminum sheet having a roll direction; and a friction stir weld butt seam connecting two edges of the sheet that are transverse to the roll direction.

DETAILED DESCRIPTION

Figure 1A:
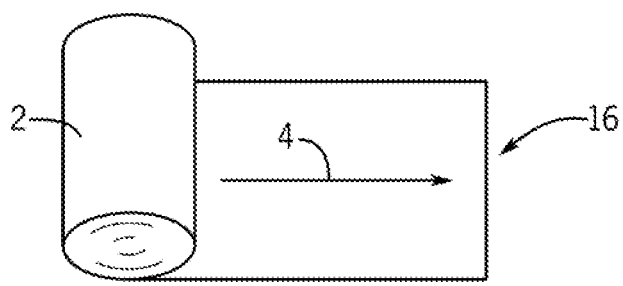
FIGS. 1A-1F are schematic depictions of a method of making a door beam according to the present subject matter.

Extruded aluminum door beams or plates have been proposed as light weight alternates to steel door beams having a closed section profile, e.g. a tube. However, the extrusion processing for forming these beams is expensive and does not achieve the desired mechanical properties. The extrusion process makes the metals more ductile, i.e. decreases strength. Extrusion of metals creates grain-orientation bias in the crystal structure of the metal in relation to the extrusion direction. If the grains are primarily oriented in one direction (i.e. in the hoop direction or the longitudinal direction of a tube), this uni-directional orientation allows cracks to form during stress testing. Using a relative intermediate strength metal does not solve this problem because these extruded metals are not ductile enough and thus exhibit cracks during stress testing, and are therefore not functionally suitable as door beams. Moving to relatively lower strength extruded metals does not solve this problem, because although they are more ductile and therefore do not crack during stress testing, they are not strong enough to resist impact requirements for door beams. Therefore, tubes with a more-random orientation of crystals, e.g. a biaxially oriented crystal structure, is desired.

Stamped aluminum door beams have also been proposed, where the aluminum sheet material is stamped into a corrugated design with an open structure such as a U-shape. However, these open structures do not have the functionality provided by door beams with a closed section profile.

Within a simulation or physical testing, structural beams can conform to the shape of the impactor in different ways, and may devolve into several very localized kinks. For side impact testing, a 3-pt bend test is used to evaluate the primary impact management components of a vehicle door, including a door beam.

The proposed door beams leverages existing process equipment in a new configuration by providing high-strength rolled aluminum alloy sheets, which are processed into sealed tubular profiles. Rolling of the aluminum does not produce the high directional sensitivity in the crystal structure as does extrusion. Thus, rolling provides a high-strength component that is sufficiently ductile to inhibit cracking, but having a high enough strength that can meet impact performance requirements for door beams, and meets or exceeds the strength of convention high-strength steel door beams but at a lower weight.

With reference to the figures, a rolled strip (i.e. a roll) 2 of flat-rolled aluminum alloy may be used as a starting material. This is in contrast to extruded aluminum alloys, which may include undesirable grain orientations, thus making the sheet aluminum alloys preferred. Based on crush testing of extrusion door beams, alloy and temper selection may be carefully managed in order to avoid fracture during extreme section crushing, all of which makes extrusion door beams relatively difficult to implement.

The composition of the material that can be used to make the roll 2 is not particularly limited, however, previous testing experience highlighted that upper-mid level strength extruded aluminum alloys (having an ultimate tensile strength "UTS" of ~400 MPa) may develop cracks due to the hoop stresses exceeding the failure thresholds. The problems associated with extruded aluminum alloys may be addressed by using the rolled aluminum alloys according to the present subject matter. Therefore, an aluminum alloy used to make the roll 2 may include 7000 series ("7xxx" series) aluminum alloys, which under testing showed potential to support a high degree of crush without cracking, but with a lower tensile force in the extruded direction (~350 Mpa). For sheet 7xxx series aluminum alloys (Ex: 7055), or another sheet aluminum alloys having ultimate tensile strength of at least 500 Mpa, 500-600 Mpa, or at least ~600 Mpa, these can be prepared by alloying aluminum mainly with zinc, and often with smaller amounts of magnesium and sometimes copper, resulting in heat-treatable alloys of very high strength. Other alloy systems can be used, such as titanium alloys, or alloys that require solid state welding to ferrous metals due to galvanic corrosion, or alloys that are otherwise not compatible with fusion welding to ferrous metals due to galvanic corrosion.

The aluminum alloy roll 2 (FIG. 1A) can be continuously cast or ingot cast. The common feature of these methods is that the molten alloy is solidified, hot-rolled or cold-rolled through roll casters, and then coiled into the roll 2. The strip of aluminum alloy may be run through a hot mill again after coiling to reduce the strip to a desired gauge. Cold rolling is performed at a temperature low enough for strain-hardening of the alloy to occur, and may be applied to a degree desired to meet or exceed product specifications. The strip of aluminum alloy may have a gauge of under one-quarter inch (6.3 mm) down to eight-thousandths of an inch (0.20 mm).

Because the aluminum alloy is a flat-rolled aluminum alloy produced by rolling the alloy as it cools through roll casters, the roll 2 of aluminum alloy has a roll direction 4, which runs along a length of the strip of material. The roll 2 may have a certain grain orientation in the roll direction 4 that provides increased strength as compared to a transverse direction of the roll 2.

As used herein, "transverse" means a direction not parallel to the roll directions 4, 18 in the plane of the roll 2 or sheet 6, and therefor is a direction in the plane of the roll 2 or sheet 6 that is angled with respect to the roll directions 4, 18. The transverse direction includes a direction that is perpendicular to the roll directions 4, 18 but this is not required, and the transverse direction can be within other angle ranges (70°-110°) from the roll directions 4, 18.

Figure 1B:
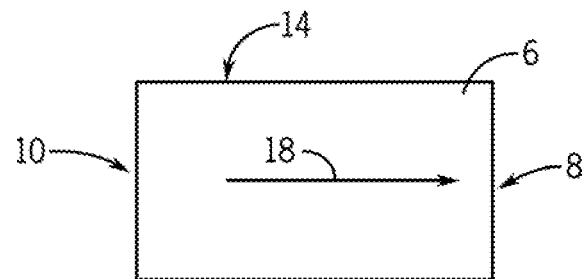

A sheet 6 may be taken from the roll 2 (FIG. 1B), such as by cutting. The sheet has a leading edge 8, a trailing edge 10 that may be opposite from the leading edge 8, a first side edge 12, and a second side edge 14 that may be opposite from the first side edge 12. The leading edge 8 of the sheet 6 may be the same as the leading edge 16 of the roll 2. The sheet 6 has a roll direction 18 that extends between the leading edge 8 and the trailing edge 10. The roll direction 18 of the sheet 6 is determined by the roll direction 4 of the roll 2.

The sheet 6 is rolled upon itself (FIG. 1C) so as to form a tube 20 (FIG. 1D), such that the roll direction 18 is transverse (e.g. within 70-110°) to a length 22 of the tube 20, which length 22 is measured between the two opens ends 24, 26 of the tube 20. More particularly, the sheet 6 is folded so that the leading edge 8 is butted up against the trailing edge 10 at a butt seam 28. This configuration will provide increased strength in the hoop direction of the tube 20 and will generally be the basis for the remainder of the disclosure. However, it should be understood that alternatively, the sheet 6 may also be rolled upon itself (FIG. 10A) so as to form a tube 20 (FIG. 10B), such that the roll direction 18 runs along the length 22 of the tube 20 (FIGS. 10A-10C), such as being parallel or within 70-110° of parallel to the length 22. More particularly, the sheet 6 is folded so that the first side edge 12 is butted up against the second side edge 14 at a butt seam 28. This configuration will provide increased strength in the longitudinal direction of the tube 20. The remainder of the disclosure, although discussed generally with respect to FIGS. 1C-1E, may be modified to accommodate this alternative arrangement of FIGS. 10A-10C.

Figure 2:
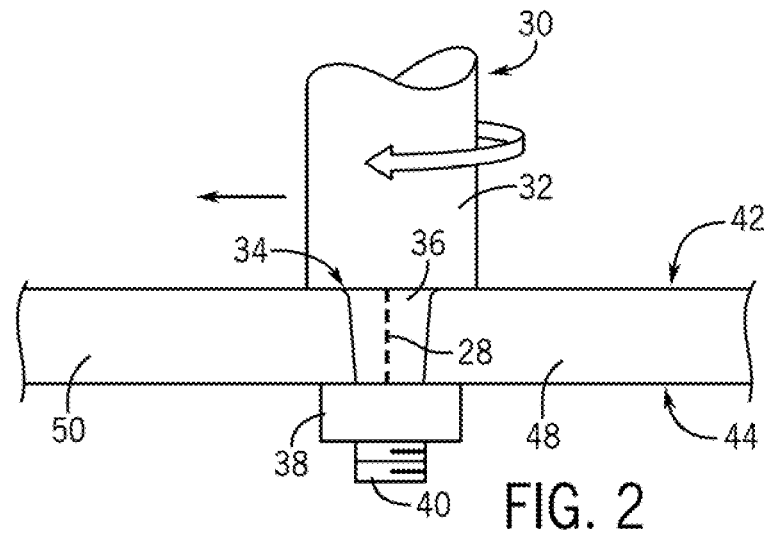
FIG. 2 is a detailed view of friction stir welding together two edges of a metal sheet according to the present subject matter.
Figure 3:
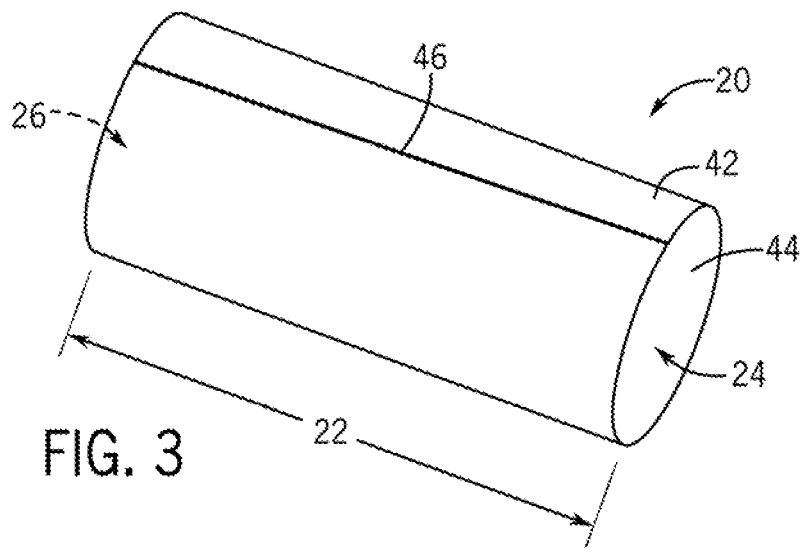
FIG. 3 is a perspective view of a tube according to the present subject matter.

At this point, the tube 20 is an open-seam tube because the butt seam 28 is not welded. In order to weld the butt seam 28 to form a closed-seam tube, friction stir welding (FIG. 2) can be employed. A friction stir weld tool 30 may include a rotating bobbin 32 including a top shoulder 34, a probe 36, and a bottom shoulder 38 attached to a threaded section 40 of the probe 36. Friction stir welding may be performed at a tube welding station, where open-seam tubes are delivered and welded. Other types of welding operations may be performed at the tube welding station, including laser welding for example, and including welding one tube 20 to another to form a larger structure.

Figure 1C:
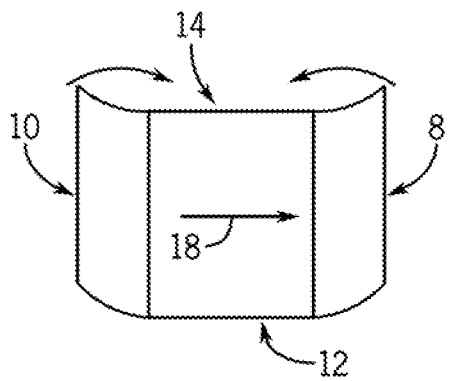
Figure 1D:
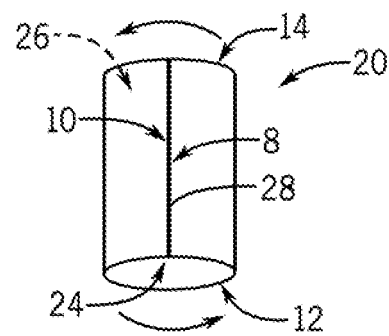
Figure 1E:
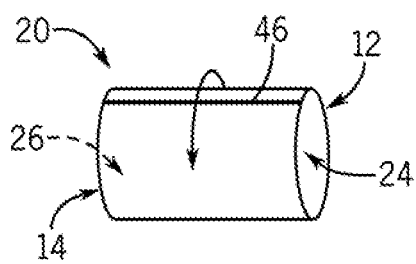
Figure 10A:
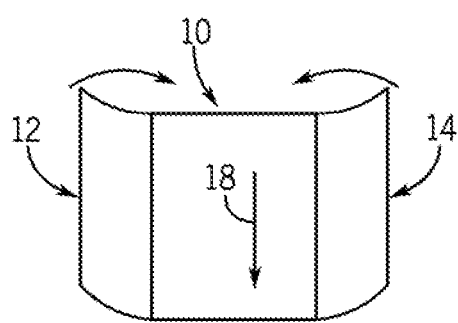
FIGS. 10A-10C are schematic depictions of another method of making a door beam according to the present subject matter.
Figure 10B:
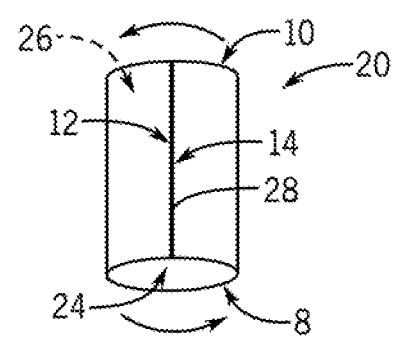
Figure 10C:
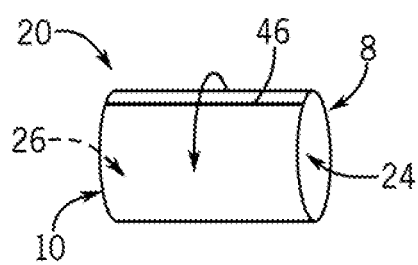

The probe 36 may be inserted between the leading edge 8 and the trailing edge 10 as with FIGS. 1C-1E, or between the two side edges 12, 14 as with FIGS. 10A-10C, with the top shoulder 34 contacting an outside surface 42 of the tube 20 and the bottom shoulder 38 contacting an inside surface 44 of the tube 20. The bottom shoulder 38 may be urged toward the top shoulder 34 by being threaded onto the threaded section 40 to squeeze the leading edge 8 and trailing edge 10 therebetween. The probe 36 then rotates and is then moved relative to the butt seam 28 along a length of the butt seam 28 to friction stir weld the butt seam 28 to form a butt joint 46, which is the welded butt seam 28. At this point, the tube 20 is a closed-seam tube because the butt joint 46 has been formed between the leading edge 8 and trailing edge 10.

Figure 4:
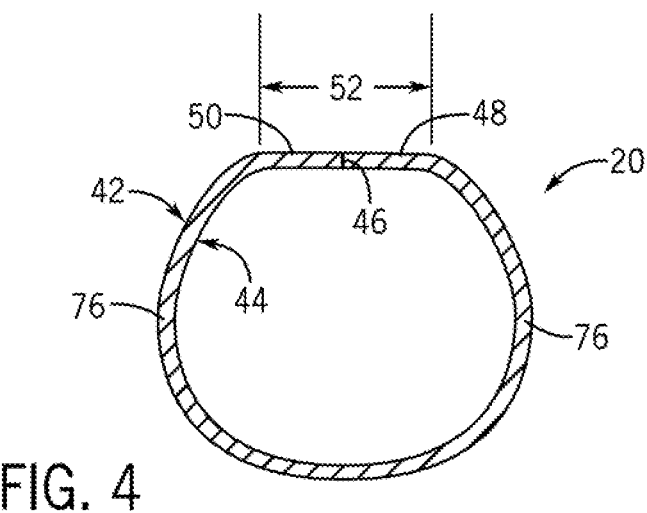
FIG. 4 is a cross-sectional view of the tube of FIG. 3.

During friction stir welding of the leading edge 8 and the trailing edge 10 as with FIGS. 1C-1E, or of the two side edges 12, 14 as with FIGS. 10A-10C, and optionally before and after friction stir welding, a first edge portion 48 and a second edge portion 50 of the tube 20 may be flat as depicted in FIG. 4, while a remaining portion 76 of the tube 20 is curved. The first edge portion 48 is directly adjacent the leading edge 8 (FIGS. 1C-1E) or the second side edge 14 (FIGS. 10A-10C) and is on one side of the butt seam 28 and butt joint 46, and the second edge portion 50 is directly adjacent the trailing edge 10 (FIGS. 1C-1E) or the first side edge 12 (FIGS. 10A-10C) and on an opposite side of the butt seam 28 and butt joint 46 from the first edge portion 48. The first edge portion 48 and the second edge portion 50 may be coplanar during friction stir welding, and optionally before and after friction stir welding to form a flat chamfer on the tube 20.

The first edge portion 48 and the second edge portion 50 may be formed in the sheet 6 before the butt seam 28 is formed. This may be accomplished by a bending tool or a pressing tool. The first edge portion 48 may extend along an entire length or only a partial length of the leading edge 8 (FIGS. 1C-1E) or of the second side edge 14 (FIGS. 10A-10C), and the second edge portion 50 may extend along an entire length or only a partial length of the trailing edge 10 (FIGS. 1C-1E) or of the first side edge 12 (FIGS. 10A-10C). The first and second edge portions 48, 50 may have a total width 52 sufficient to allow the first and second edge portions 48, 50 to be inserted into the rotating bobbin 32 for friction stir welding. This width 52 may range from 0.1 cm to 10 cm or more, for example.

Figure 5:
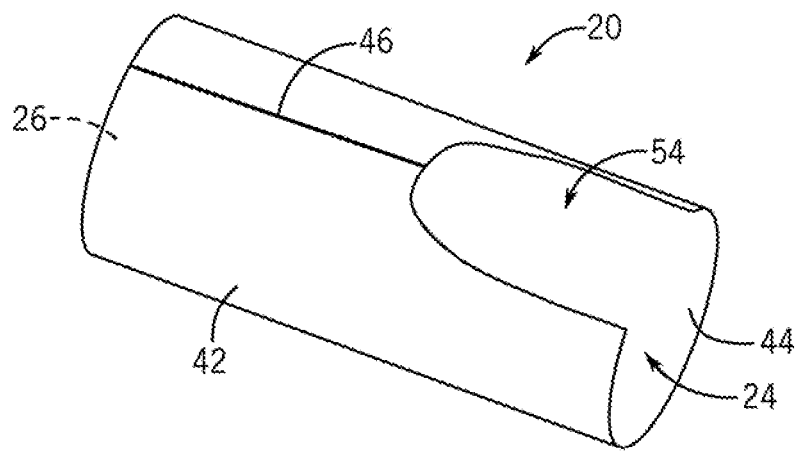
FIG. 5 is a perspective view of a modified version of the tube of FIG. 3.
Figure 6:
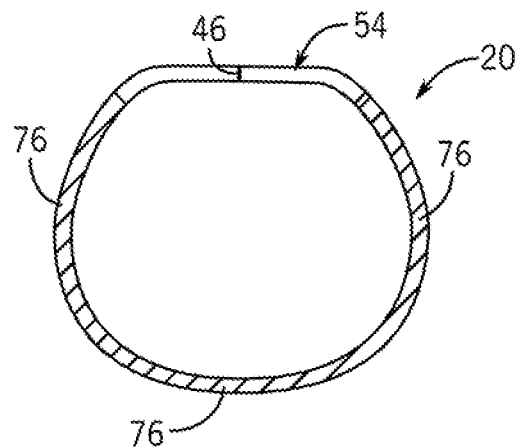
FIG. 6 is a cross-sectional view of the modified tube of FIG. 5.

Before friction stir welding, the sheet 6 may be altered so as to provide apertures through its thickness. In a non-limiting example, a quarter ellipse piece of the sheet 6 may be removed between the leading edge 8 and the first side edge 12 (FIGS. 1C-1E) or between the second side edge 14 and the leading edge 8 (FIGS. 10A-10C), and another quarter ellipse piece of the sheet 6 may be removed between the trailing edge 10 and the first side edge 12 (FIGS. 1C-1E) or between the first side edge 12 and the leading edge 8 (FIGS. 10A-10C) so that when the tube 20 is formed, the tube 20 has a U-shaped aperture 54 at the open end 24 (FIGS. 5 and 6). The U-shaped aperture 54 may be used as a welding interface for welding the tube 20 to another component of the vehicle door 58 (FIG. 8) or a vehicle, or for providing direct access to, or to form, a mounting hole 56. The quarter ellipses may be cut out, stamped out, lasered, or removed by other types of machining operations. The sheet 6 may be altered in different ways by removing different shaped pieces to form the aperture 54 extending through a thickness of the sheet 6, and these different shaped pieces may be removed from the sheet 6 as desired. The aperture 54 may have different shapes other than the U-shape. Alternatively, the U-shaped or other shaped apertures 54, may be formed in the tube 20 after the butt joint 46 is formed. The aperture 54 is shown to have an open perimeter at the end 24 of the tube 20 and is thus U-shaped, but this is not required and the aperture 54 may instead have a closed perimeter, e.g. O-shaped. A similar aperture 54 can be formed at the other open end 26 of the tube 20 (see FIG. 9).

The tube 20 may be modified after friction stir welding so as to provide other openings/apertures therein. In a non-limiting example, a mounting hole 56 is formed on a side of the tube 20 opposite, in cross section, from the U-shaped aperture 54 as shown in FIG. 6, and may be formed near the open end 24 of the tube 20 where the U-shaped aperture 54 is located. The mounting hole 56 may be used as an aperture, through which a fastener 70 is inserted for connecting the tube 20 to a door 58 (FIG. 8) when the tube 20 is installed as part of a vehicle door 58. The mounting hole 56 may be formed by being cut out, stamped out, lasered, or removed by other types of machining operations. The aperture 54 may provide a clear access path (See FIG. 9) for a tool to be inserted into the tube to form the mounting hole 56. More particularly, because the aperture 54 is formed in the tube 20, the tool can be arranged on a side of the tube 20 including the butt joint 46 (i.e. the top side in FIGS. 6-7), be inserted through the aperture 54 to access the inside surface 44 on an opposite side of the tube 20 (i.e. the bottom side in FIGS. 6-7), and then modify the tube 20 to form the mounting hole 56 on the bottom side of the tube 20. The mounting hole 56 may be formed, for example, by a punching tool or other type of forming tool inserted through the aperture 54. Alternatively, the mounting hole 56 may be formed in the sheet 6 before the tube 20 is formed. The mounting hole 56 may be formed after, or alternatively before, a cross-sectional shape of the tube 20 is modified. A similar mounting hole 26 can be formed at the other open end 26 of the tube 20 (see FIG. 9).

Figure 7:
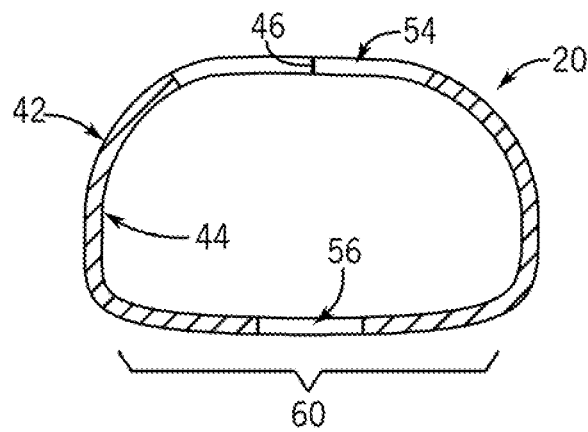
FIG. 7 is a cross-sectional view of a further modified version of the modified tube of FIG. 6.

The cross-sectional shape of the tube 20 may be modified by pressing the tube 20 to change the cross-sectional shape of the tube 20, for example, from that shown in FIG. 6 to that shown in FIG. 7, which includes a flat area 60 in which the mounting hole 56 may be formed. The flat area 60 may extend along all or part of the length 22 of the tube 20. Such pressing may be performed after the butt joint 46 is formed. The cross-sectional shape of the tube 20 may be altered from that shown in FIG. 6 in ways to produce other cross-sectional shapes than that shown in FIG. 7. The pressing may be performed for providing a desired cross-sectional shape of the tube 20, which may enhance the performance (e.g. strength) of the tube 20 or may allow the tube 20 to fit properly with other components of the vehicle door 58, such as with end connectors 64, 66 (FIG. 8), also referred to herein as mounting brackets. The modified cross-sectional shape of the tube 20 may be determined according to specifications for the vehicle door 58.

Figure 8:
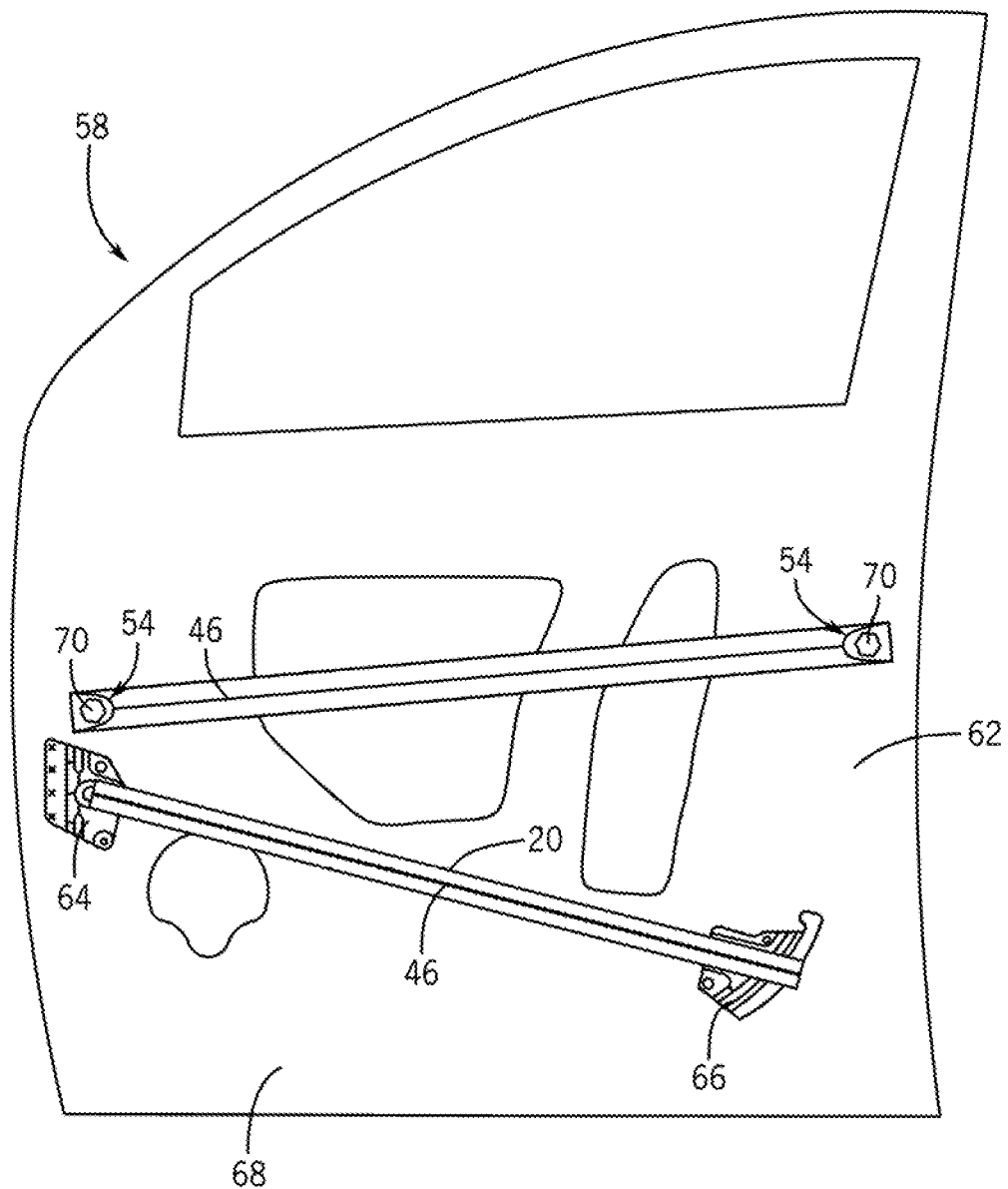
FIG. 8 is side view of an assembly according to the present subject matter.
Figure 9:
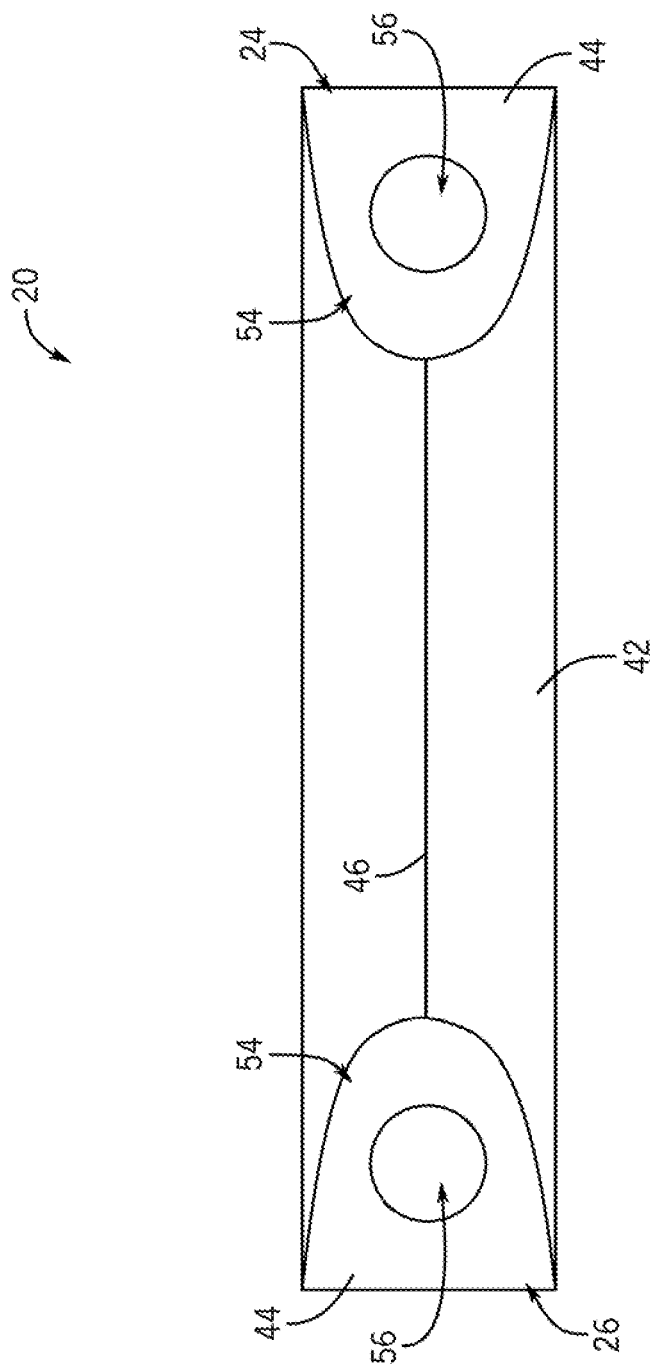
FIG. 9 is a top view of a beam according to the present subject matter.

The tube 20 may be arranged as part of the vehicle door 58 as a stand-alone component. The tube 20 may be mounted directly to the door frame 62 using connectors 70 mounted through the mounting holes 56 on either end of the tube 20, or optionally indirectly using end connectors 64, 66 that are connected to opposite ends of the tube 20. The end connectors 64, 66 may be fastened to the tube 20 by bolts or other connectors inserted through the mounting holes 56. If no mounting holes 56 are included in the tube 20 at the flat area 60, then the end connectors 64, 66 could be connected to the tube 20 by friction stir welding at the flat area 60, by self-piercing rivets, flow drill screws, or other self-piercing connectors. Optionally, the tube 20 does not include the aperture 54, and a connector may be inserted all the way through the tube 20 to connect it to the door frame 62 or end connectors 64, 66, wherein a mandrel may be inserted into each open end 24, 26 of the tube 20 and a connector inserted through the entire tube from one side to the other and connected to the door frame 62 or end connectors 64, 66. The end connectors 64, 66 are fastened to the door frame 62, e.g. by being bolted (indicated by circles on the end connectors 64, 66 in FIG. 8), tack welded (indicated by "x" in FIG. 8), or otherwise attached to an interior 68 of the door frame 62. The composition of the end connectors 64, 66 is not particularly limited, and may include steel, aluminum, other metals, or alloys thereof. This arrangement of components can be include as part of the vehicle door 58 to provide side impact protection for occupants of the vehicle. As depicted in FIG. 8, the tube is arranged on the interior 68 of the door frame 62 at an angle from horizontal. The tube 20 may be arranged differently than depicted in FIG. 8, for example at a different angle than that shown, on an exterior of the door frame 62, or at other locations on the door 58 or on other doors or parts of a vehicle, such as a trunk lid, hood, roof, fender, etc. to provide added impact protection or strength to those components.

Figure 1F:
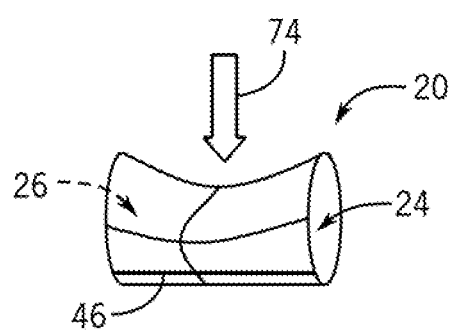

As arranged on the door 58, e.g. on the door frame 62 (FIG. 8), the butt joint 46 may be arranged as depicted in FIG. 1E to be not facing a likely impact direction 74, for example facing directly away from the exterior of the vehicle door where a likely impact may come from. This may be on a side opposite from a compressive side of the tube 20 during an impact, and thus may avoid the highly localized hoop or buckling stress associated with the deformation due to impingement by some impactor. This impact direction 74 may be to an outside of the vehicle door 58, where the vehicle door 58 may be subject to a side impact collision from another vehicle. In this arrangement, the tube 20 may deform (FIG. 1F) from the impact force, but the butt joint 46 does not directly absorb the impact force because it is facing away from the impact direction 74. Alternatively, the butt joint 46 could be facing the impact direction 74, and thus be on a compressive side of the tube 20 and thus absorb the highly localized hoop or buckling stress associated with the deformation due to impingement by some impactor. This could be of some benefit to avoid the global tensile stress on the back side of the tube 20 opposite from the impact direction 74. The placement of the butt joint 46 in relation to the impact direction 74 can be arranged in any position relative to the impact direction 74. That is, the location of the butt joint 46 with respect to the impact direction 74 can be tailored as desired for specific geometries and compositions of the tube 20, and in relation to likely impact conditions.

Tubular door beam materials preferably react without facture in response to the high loads of side impacts that can cause extreme buckling of the door beam. Material properties within a tubular structure such as the tube 20, can be simplified as a longitudinal stress component and a radial or hoop stress component. Because the roll direction 18 of the sheet 6 in arranged in the circumferential direction around the tube 20 (FIGS. 1C-1E), the oriented material may provide more resistance to hoop stress on the tube 20 during a side impact on the vehicle door 58. If the roll direction 18 of the sheet 6 in arranged in the longitudinal direction along the length 22 of the tube 20 (FIGS. 10A-10C), the oriented material may provide more resistance to longitudinal stress on the tube 20 during an impact on the vehicle door 58.

Proper material selection and orientation for door beam applications may insure that even under highly localized deformation, the general continuity of the tube 20 is maintained even with high loadings applied to the tube 20. Sheet material of high strength aluminum alloy can have UTS values in excess of 600 Mpa in the roll direction 18, with less than 10% drop in properties in the transverse direction. Recent research has clarified that adjustments to alloy chemistry and an overage temper (Ex: T76) can still provide strength levels in excess of 500 Mpa before the onset of fracture.

A method for making a door beam includes providing a flat-rolled aluminum alloy sheet 6; bringing together two edges 8, 10 of the sheet 6 that are transverse to the roll direction 18 (FIGS. 1C-1E) or two edges 12, 14 of the sheet 6 that are parallel (or within 70°-110° from parallel) to the roll direction 18 (FIGS. 10A-10C) to thereby form a butt seam 28; and friction stir welding the butt seam 28 to form a tube 20 with a butt joint 46.

Another method for producing a vehicle door includes providing a sheet 6 of flat-rolled aluminum alloy, the sheet 6 having a leading edge 8, an opposite trailing edge 10, and a roll direction 18 extending from the leading edge 8 to the trailing edge 10. The method includes friction stir welding the leading edge 8 to the trailing edge 10 (FIGS. 1C-1E) or a first side edge 12 to a second side edge 14 (FIGS. 10A-10C) at a butt joint 46 to form a tube 20 of the flat-rolled aluminum alloy, which is then arranged as part of the vehicle door.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for making a tube comprising:
    providing a flat-rolled aluminum alloy sheet having a roll direction;
    bringing together two edges of the sheet that are transverse to the roll direction to thereby form a butt seam;
    friction stir welding the butt seam to form the tube; and
    removing a portion of the sheet before friction stir welding to form an aperture extending through a thickness of the sheet and having an opening at an end of the tube.

2. The method according to claim 1, further comprising pressing the tube to form a flat area in the tube.

3. The method according to claim 2, further comprising removing a portion of the flat area from the tube to form a mounting hole in the flat area.

4. The method according to claim 1, further comprising:
    arranging end connectors on two ends of the tube; and
    mounting the end connectors to a vehicle door, wherein the tube is a door beam in the vehicle door.

5. A method of producing a door beam comprising:
    providing a sheet of flat-rolled aluminum alloy, the sheet having a leading edge, an opposite trailing edge, and a roll direction extending from the leading edge to the trailing edge;
    friction stir welding the leading edge to the trailing edge at a butt joint to form a tube of the flat-rolled aluminum alloy;
    removing a portion of the sheet before friction stir welding to form an aperture extending through a thickness of the sheet and having an opening at an end of the tube; and
    securing mounting brackets to the tube, the mounting brackets being securable to a vehicle door.

6. The method according to claim 5, further including securing the mounting brackets to the vehicle door, wherein a side of the tube including the butt joint does not directly face an exterior of the vehicle door.

7. The method according to claim 5, wherein the mounting brackets are secured to two ends of the tube.

8. The method according to claim 5, further comprising pressing the tube to form a flat area in the tube.

9. The method according to claim 8, further comprising removing a portion of the flat area from the tube to form a mounting hole in the flat area.

* * * * *